United States Patent [19]

Fedeli

[11] Patent Number: 5,350,263
[45] Date of Patent: Sep. 27, 1994

[54] TOOLHEAD FOR CHIP-FORMING MACHINE TOOLS

[75] Inventor: Giancarlo Fedeli, Foligno, Italy

[73] Assignee: Gifam S.r.l., Foligno, Italy

[21] Appl. No.: 38,525

[22] Filed: Mar. 29, 1993

[30] Foreign Application Priority Data

Mar. 30, 1992 [IT]  Italy .............................. PG92 A 0005

[51] Int. Cl.$^5$ ........................... B23C 1/06; B23B 47/06
[52] U.S. Cl. .................................... 409/231; 408/129; 408/238
[58] Field of Search ................... 409/231, 233; 901/41; 408/239 R, 238; 483/55

[56] References Cited

U.S. PATENT DOCUMENTS 5,009,554 4/1991 Kameyama ..................... 409/231
5,100,271 3/1992 Kameyama et al. ............ 409/231

FOREIGN PATENT DOCUMENTS 0362781 10/1989 European Pat. Off. .
3819181 12/1989 Fed. Rep. of Germany .
157745 7/1987 Japan ....................... 483/55
3251384 11/1991 Japan ....................... 901/41

Primary Examiner—William Briggs
Attorney, Agent, or Firm—Ladas & Parry

[57] ABSTRACT

A toolhead (9) wherein the spindle (21) of the tool (11) is rotated about its axis (10) and in relation to the casing (12) of the toolhead (9) by a first motor (28), and is moved along the axis (10) by a drive (38) activated by a second motor (39); the spindle (21), motors (28)(39) and drive (38) being mutually aligned along the axis (10) of the spindle (21), and being housed inside the sleeve (16) supporting the spindle (21).

16 Claims, 2 Drawing Sheets

TOOLHEAD FOR CHIP-FORMING MACHINE TOOLS

BACKGROUND OF THE INVENTION

The present invention relates to a toolhead for chip-forming machine tools.

More specifically, the present invention relates to a toolhead of the type presenting an axis and comprising an outer casing; at least one sleeve coaxial with said axis and connected in axially-sliding, angularly-fixed manner to the casing; a tool spindle connected in rotary, axially-fixed manner to the sleeve; first drive means for rotating the spindle about said axis and in relation to the sleeve; and second drive means for moving the sleeve along said axis and in relation to the casing.

In known toolheads of the type described above, rotation of the spindle in relation to the sleeve and axial displacement of the sleeve in relation to the outer casing are achieved by means of a respective first and second motor located outside the sleeve and connected respectively to the spindle and sleeve via respective, e.g. gear or belt, drives and normally splined type couplings.

The location of the above motors and the presence of the drives connecting the motors to the respective driven elements render the above known toolheads not only cumbersome and complex in design but also relatively unreliable, especially by virtue of the large number of components in relative motion and, as such, subject to wear.

In order to overcome the above drawbacks, it is known from U.S. Pat. No. 5,009,554 and EP-A-0 362 781 to provide a toolhead of the type described above, in which the above first and second motors, the respective drives and the sleeve, which in EP-A-0 362 781 is integral with the aforementioned tool-carrying spindle, are all aligned with one another along the axis of the casing.

The above arrangement simplifies the design of the toolhead, reduces the number of components in relative motion, and increases reliability, but introduces a limitation in the rigidity of the spindle and, therefore, in the torque and shear which may be applied thereto. This is due to the fact that the spindle and the sleeve are to be mounted through at least one of the motors, and have limited diameters if costs and size are to be maintained within acceptable limits.

SUMMARY OF THE INVENTION

It is an object of the present invention to provide a straightforward, low-cost, highly reliable toolhead designed to overcome the aforementioned drawback.

According to the present invention, there is provided a toolhead for chip-forming machine tools; said toolhead presenting an axis and comprising an outer casing; at least a sleeve coaxial with said axis and connected in axially-sliding, angularly-fixed manner to the casing; a spindle for supporting a tool and connected to said sleeve in axially-fixed manner and so as to rotate about said axis; a first motor for rotating the spindle about said axis and in relation to the sleeve; a drive for moving said sleeve along said axis and in relation to the casing; and a second motor for activating said drive; the spindle, motors and said drive being housed inside the sleeve in a substantially mutually aligned arrangement along said axis.

In the toolhead set forth above, the sleeve is large enough to accommodate the motors, and can, therefore, accommodate a spindle of suitable diameter; moreover, such diameter is no longer limited by the internal diameter of the rotor of at least one of the motors, since the spindle extends outside the motors for its total length.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
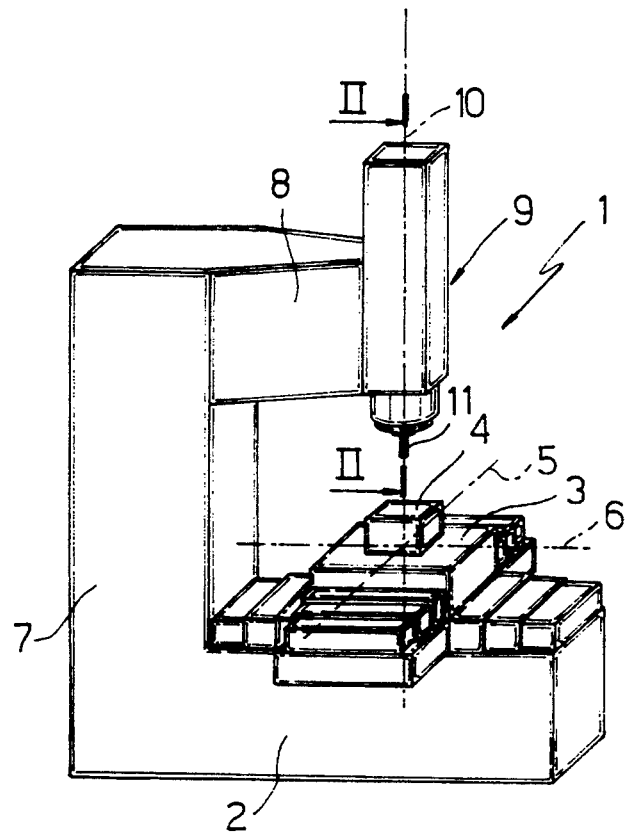
FIG. 1 shows a schematic view in perspective of a preferred embodiment of the toolhead according to the present invention, connected to a chip-forming machine tool.

Numeral 1 in FIG. 1 indicates a chip-forming machine tool comprising a base 2; and a work table 3 connected in known manner to base 2, and movable in relation to base 2 by a known drive unit (not shown), so as to move a workpiece 4 in two horizontal, perpendicular directions 5 and 6.

Machine tool 1 also comprises an upright pedestal 7 having a bottom end portion connected integrally with base 2, and a top end portion fitted with a fixed arm 8 supporting toolhead 9.

In FIG. 1, toolhead 9 presents a vertical axis 10, and provides for supporting and moving, along axis 10, any one of a number of interchangeable tools 11 employed on machine tool 1.

Figure 2:
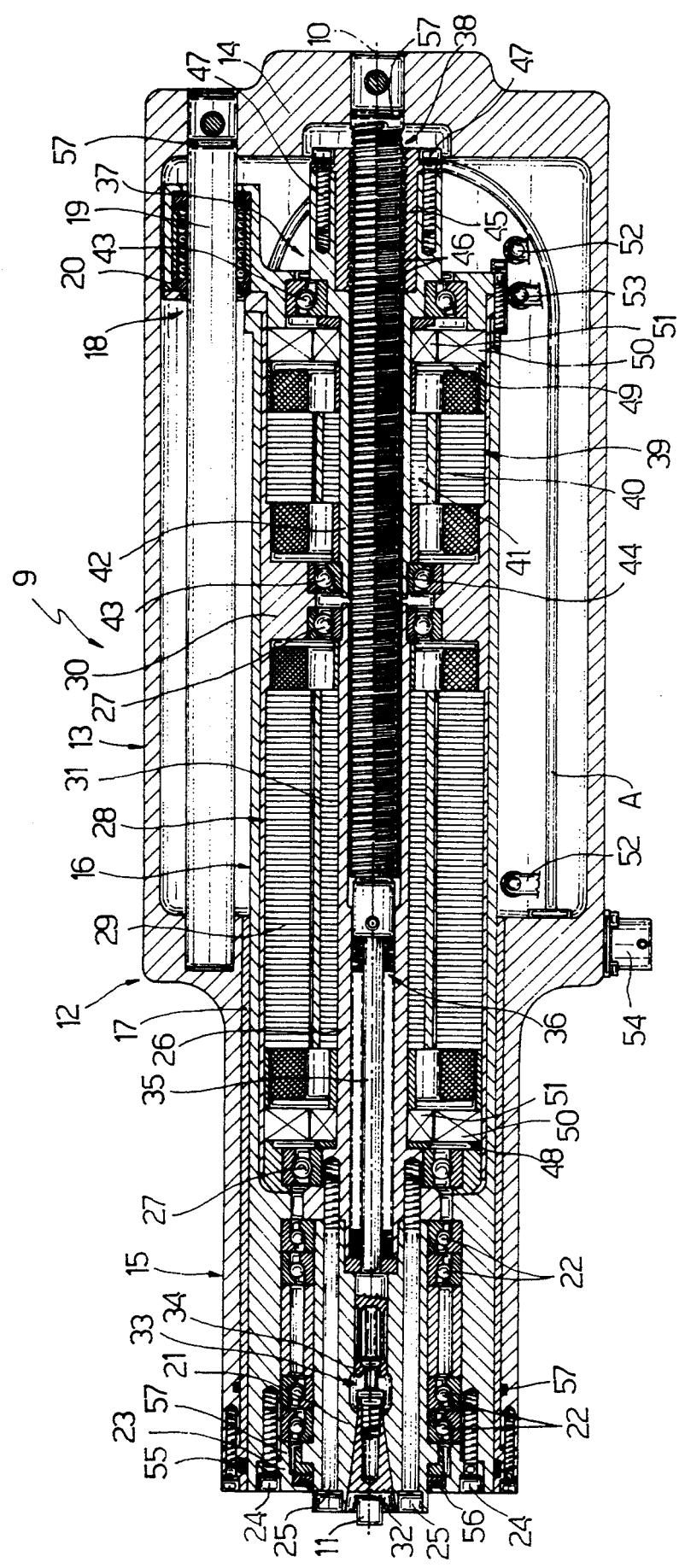
FIG. 2 larger-scale section along line II—II in FIG. 1.

As shown in FIG. 2, toolhead 9 comprises an elongated outer casing 12 connected integrally with arm 8 and presenting a first tubular portion 13 coaxial with axis 10 and closed at a first end by a wall 14, and a second tubular cylindrical portion 15 extending from a second end of portion 13 and coaxial with axis 10. Portion 15 defines a guide for a cylindrical sleeve 16 coaxial with axis 10 and connected in axially-sliding manner to portion 15 via the interposition of a liner 17 of antifriction material. According to a variation not shown, liner 17 is replaced by a recirculating-ball bushing.

Sleeve 16 is locked angularly in relation to casing 12 by means of an angular lock device 18 comprising a fixed guide rod 19 connected to portion 13 and parallel to axis 10; and a recirculating-ball bushing 20 connected integrally with the end portion of sleeve 16 facing wall 14, and connected in axially-sliding manner to rod 19.

The end portion of sleeve 16 opposite that facing wall 14 houses a spindle 21 for supporting tool 11. Spindle 21 extends coaxially with axis 10, and is connected to sleeve 16 in rotary, axially-fixed manner by means of four bearings 22 gripped against respective shoulders of sleeve 16 by a bushing 23 connected to sleeve 16 by a number of screws 24.

By means of a number of screws 25, spindle 21 is connected integrally with a hollow shaft 26 coaxial with axis 10 and connected to sleeve 16 by a pair of bearings 27, and is rotated about axis 10 by an electric motor 28 housed coaxially inside sleeve 16. More specifically, motor 28 is quill-drive type with its stator 29 secured integrally with the inner surface of sleeve 16 by a cylindrical casing 30, and its rotor 31 fitted to an intermediate portion of shaft 26.

Spindle 21 presents a taper seat positively engaged by a known toolholder 32 for supporting tool 11 and which is retained inside the taper seat by a known releasable retaining device 33. More specifically, device 33 comprises a jaw 34 for positively engaging the shank of toolholder 32; and a control rod 35 connected to jaw 34, extending inside shaft 26, and loaded by a spring 36, also housed inside shaft 26, for maintaining jaw 34 closed when in use.

still with reference to FIG. 2, toolhead 9 also comprises an actuating device 37 for moving sleeve 16 in relation to casing 12 and between a fully extracted and fully withdrawn position along axis 10. Actuating device 37 comprises a recirculating-ball drive 38 substantially inside sleeve 16 and coaxial with axis 10; and motor 39 for activating drive 38.

Motor 39 is quill-drive type housed inside sleeve 16, with its stator 40 secured to the inner surface of sleeve 16 by casing 30. Motor 39 also presents a hollow rotor 41 fitted to a hollow supporting shaft 42 coaxial with axis 10 and connected to sleeve 16 in rotary, axially-fixed manner by means of a pair of bearings 43 on casing 30.

Drive 38 comprises an externally threaded shaft 44 coaxial with axis 10, engaging in axially-sliding manner shaft 42 and at least part of shaft 26, and having an end portion connected integrally with wall 14, and an opposite end portion which, when sleeve 16 is close to the withdrawn position, contacts the end of and so defines an axial stop for rod 35.

Drive 38 also comprises a nut 45 connected to shaft 44 via the interposition of a number of balls 46, and connected integrally with shaft 42 by means of a number of screws 47.

still with reference to FIG. 2, toolhead 9 also comprises two position and angular speed transducers 48 and 49 for respectively controlling motors 28 and 39. Transducers 48 and 49 are housed inside sleeve 16, and present respective stators 50 secured integrally with the inner surface of sleeve 16 by casing 30, and respective rotors 51 fitted respectively to shafts 26 and 42.

Finally, toolhead 9 comprises a pair of limit sensors 52 for determining said two limit positions of sleeve 16; and a further position sensor 53 for determining a zero position of sleeve 16. Sensors 52 and 53, transducers 48 and 49, and motors 28 and 39 are connected by respective wires A (only part of which is shown) and by a connector 54 to a known control system (not shown) for controlling and driving toolhead 9.

Finally, on toolhead 9, motors 28 and 39 are cooled and bearings 22, 27 and 43 lubricated by oil filling all the gaps inside casing 12, which is sealed by a dynamic seal 55, a rotary seal 56, and static seals 57. Outwards, dynamic seal 55 also presents a scraper element for preventing dirt from infiltrating inside casing 12.

According to a variation not shown, and which is particularly suitable for heavy-duty applications, toolhead 9 also comprises a unit for cooling the oil inside casing 12; and an electromagnetic brake, connected to shaft 42, for locking rotor 41 under given operating conditions.

In actual use, spindle 21 and, consequently, tool 11 are rotated about axis 10 by motor 28, and are controlled as to speed and angular position by the control system (not shown) as a function of the signals supplied to the control system by transducer 48. Axial displacement of spindle 21, on the other hand, is controlled by motor 39, which acts on sleeve 16 via drive 38, and is also controlled by the control system (not shown) as a function of the signals supplied to the control system by transducer 49.

By virtue of the internal configuration of toolhead 9, this is therefore extremely straightforward in design and considerably more compact and lightweight as compared with known toolheads. Furthermore, the internal configuration of toolhead 9 also provides for a high degree of reliability due mainly, though not exclusively, to the relatively small number of mutually sliding components involved.

Figure 3:
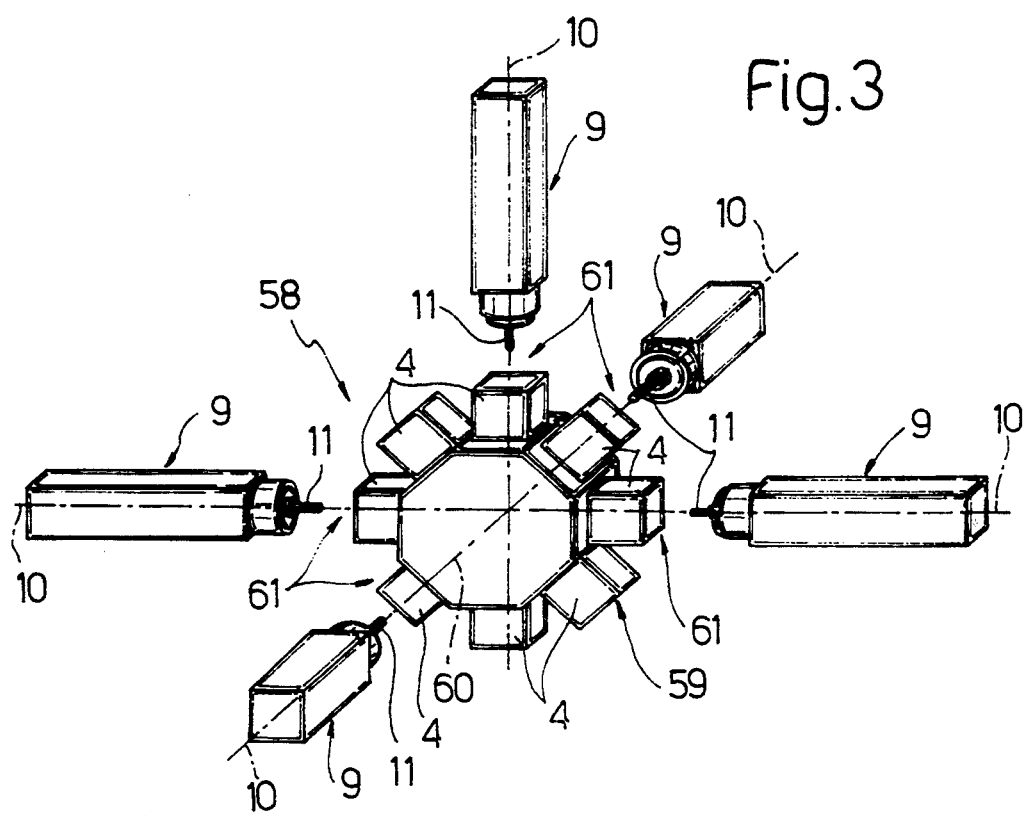
FIG. 3 shows a partial view in perspective of a machine tool featuring a number of toolheads in accordance with the present invention.

FIG. 3 shows a machine tool 58 differing slightly in design from machine tool 1 and the component parts of which are indicated, where possible, using the same numbering system.

Machine tool 58 is a multispindle machine comprising, in place of table 3, a turret 59 supporting a number of workpieces 4, and rotated in steps in relation to the base (not shown) and about a substantially horizontal axis 60, for successively feeding workpieces 4 through a number of work stations 61. Instead of a single toolhead 9, machine 58 comprises a number of variously-oriented toolheads 9, each positioned facing a respective workpiece 4 in a respective station 61, for performing a specific machining operation on workpiece 4.

According to a further variation not shown, at each station 61, machine tool 58 comprises two or more toolheads 9 for performing different machining operations on workpiece 4 simultaneously.

I claim:

1. A toolhead for chip-forming machine tools; said toolhead presenting an axis and comprising an outer casing; a sleeve coaxial with said axis and connected in axially-sliding, angularly-fixed manner to the casing; a spindle for supporting a tool and connected to said sleeve in axially-fixed manner and able to rotate about said axis; a first motor for rotating the spindle about said axis and in relation to the sleeve; a drive for moving said sleeve along said axis and in relation to the casing; and a second motor for activating said drive; the spindle, both said first and second motors and said drive being housed inside the sleeve in a substantially mutually aligned arrangement along said axis.

2. A toolhead as claimed in claim 1, wherein each of said first and second motors comprises a respective stator connected integrally with said sleeve and axially movable therewith.

3. A toolhead as claimed in claim 2, wherein each of said first and second motors comprises a respective rotor connected to said sleeve in axially-fixed manner and able to rotate about said axis.

4. A toolhead as claimed in claim 2, wherein said motors are quill-drive motors; the spindle comprising a drive shaft coaxial with said axis; and the rotor of the first motor being fitted to said drive shaft.

5. A toolhead as claimed in claim 4, wherein said drive is a recirculating-ball drive, and comprises a central shaft coaxial with said axis and connected integrally with one of either said casing or the rotor of said second motor; a nut outside and coaxial with said central shaft and connected integrally with the other of either said casing or the rotor of said second motor; and a number of balls interposed between said central shaft and said nut.

6. A toolhead as claimed in claim 5, wherein said central shaft is connected integrally with said casing, and said nut is connected integrally with the rotor of said second motor; said central shaft extending through the rotor of said second motor and at least partially through the rotor of said first motor.

7. A toolhead as claimed in claim 1, further comprising lock means for locking said sleeve in angularly-fixed manner in relation to said casing.

8. A chip-forming machine tool comprising at least one toolhead as claimed in claim 1.

9. A toolhead for chip-forming machine tools; said toolhead having an axis and comprising an outer casing; a sleeve coaxial with said axis and connected in axially-sliding, angularly-fixed manner to the casing; a spindle for supporting a tool and connected to said sleeve in axially-fixed manner and able to rotate about said axis; a first motor for rotating the spindle about said axis and in relation to the sleeve; a drive for moving said sleeve along said axis and in relation to the casing; and a second motor for activating said drive; said spindle, both said first and second motors and said drive being housed inside the sleeve in a substantially mutually aligned arrangement along said axis; the first and second motors each comprising a respective rotor; said drive comprising a central shaft coaxial with said axis and connected integrally with one of either the casing or the rotor of the second motor, and an external nut coaxial with the central shaft and connected integrally with the other of either said casing or the rotor of said second motor; the central shaft being connected integrally with the casing, and the nut being connected integrally with the rotor of the second motor; and the central shaft extending through the rotor of the second motor and at least partially through the rotor of the second motor and at least partially through the rotor of the first motor.

10. A toolhead as claimed in claim 9, wherein each of said first and second motors further comprises a respective stator connected integrally with said sleeve and axially movable therewith.

11. A toolhead as claimed in claim 10, wherein each said rotor is connected to said sleeve in axially-fixed manner and so as to rotate about said axis.

12. A toolhead as claimed in claim 9, wherein each said rotor is connected to said sleeve in axially-fixed manner and so as to rotate about said axis.

13. A toolhead as claimed in claim 9, wherein said drive is a recirculating-ball drive comprising a number of balls interposed between said central shaft and said nut.

14. A toolhead as claimed in claim 9, wherein said motors are quill-drive motors; the spindle comprising a drive shaft coaxial with said axis; and the rotor of the first motor being fitted to said drive shaft.

15. A toolhead as claimed in claim 9, further comprising lock means for locking said sleeve in angularly-fixed manner in relation to said casing.

16. A toolhead as claimed in claim 3, wherein said motors are quill-drive motors; the spindle comprising a drive shaft coaxial with said axis; and the rotor of the first motor being fitted to said drive shaft.

* * * * *